United States Patent
Zeng

(10) Patent No.: US 12,253,128 B2
(45) Date of Patent: Mar. 18, 2025

(54) BRAKE FLUID PIPE DETECTOR

(71) Applicant: Jhih-Hua Zeng, Taichung (TW)

(72) Inventor: Jhih-Hua Zeng, Taichung (TW)

(*) Notice: Subject to any disclaimer, the term of this patent is extended or adjusted under 35 U.S.C. 154(b) by 369 days.

(21) Appl. No.: 17/836,545

(22) Filed: Jun. 9, 2022

(65) Prior Publication Data
US 2023/0184303 A1 Jun. 15, 2023

(30) Foreign Application Priority Data
Dec. 13, 2021 (TW) ................. 110214821

(51) Int. Cl.
*F16D 65/00* (2006.01)
*B60T 17/04* (2006.01)
*F16D 55/00* (2006.01)

(52) U.S. Cl.
CPC ........ *F16D 65/0068* (2013.01); *B60T 17/046* (2013.01); *F16D 2055/0016* (2013.01)

(58) Field of Classification Search
CPC ...... B60T 17/22; B60T 17/221; B60T 17/043; B60T 17/046; B60T 2055/0016; B60T 65/0068
See application file for complete search history.

(56) References Cited

U.S. PATENT DOCUMENTS

| | | | | |
|---|---|---|---|---|
| 3,893,549 A | * | 7/1975 | Bennett | F16D 65/18 188/170 |
| 7,913,824 B2 | * | 3/2011 | Ishida | F16D 65/18 188/106 R |
| 2020/0001848 A1 | * | 1/2020 | Gaggero | F16D 51/30 |
| 2020/0254985 A1 | * | 8/2020 | Wiesen | B60T 17/22 |
| 2023/0184303 A1 | * | 6/2023 | Zeng | B60T 17/046 188/26 |

FOREIGN PATENT DOCUMENTS

| | | | | |
|---|---|---|---|---|
| CN | 201544954 U | * | 8/2010 | ............ B60T 17/22 |
| CN | 214309182 U | * | 9/2021 | ............ G01K 7/02 |
| EP | 0240625 A1 | * | 10/1987 | ............ F16D 55/22 |
| EP | 3608183 A1 | * | 2/2020 | ............ B60T 11/30 |
| JP | 2010144815 A | * | 7/2010 | ............ F16D 66/00 |

* cited by examiner

*Primary Examiner* — Thomas J Williams
(74) *Attorney, Agent, or Firm* — Rosenberg, Klein & Lee

(57) ABSTRACT

A brake fluid pipe detector is provided. The brake fluid pipe detector which is arranged between a brake hose and a brake caliper include a main body which is provided with a fastening end for connection to the brake caliper and is communicating with the brake hose for delivering brake fluid. The brake fluid pipe detector features on that at least one installation port is arranged at the main body and installed with a sensor correspondingly. Thereby brake data and information such as working temperature and brake pressure of the brake fluid in the brake hose and the brake caliper can be detected by the sensor so as to ensure driving safety.

2 Claims, 6 Drawing Sheets

BRAKE FLUID PIPE DETECTOR

BACKGROUND OF THE INVENTION

Field of the Invention

The present invention relates to a brake fluid pipe detector, especially to a brake fluid pipe detector which detects various data and information of a brake fluid in a brake fluid pipe such as working temperature and brake pressure.

Description of Related Art

Generally, braking systems are divided into two types, hydraulic disc brakes and mechanical disc brakes. The mechanical disc brake pulls the brake by steel wire and more strength is needed while the hydraulic disc brakes rely on oil to push the piston by hydraulic pressure and further complete the braking process. A huge braking force is obtained by pressing easily.

Brake fluid for motor vehicles is a type of liquid medium used in hydraulic brake system for transmission of braking fierce in motor vehicles. The brake pressure is often 2 MPa and may be up to 4-5 MPa. The brake fluid transmits the force applied by the driver of a car to the wheel brakes. Almost all of the modern trucks use brake fluid. Thus quality and performance of the brake fluid is highly associated with the safety performance of the vehicle.

The brake fluid should have the following features, 1. No resistance caused by friction during force transmission by hydraulic pressure. 2. Lower permeability. 3. High boiling point. The brake fluids are exposed to very high temperature due to braking in a moving vehicle and thus its temperature is easy to be over 130° C. The brake fluid with lower boiling point is turning to vapour and causing bubbles. The braking power will be lost. 4. Good viscosity stability: the viscosity index (VI) should be high so that the less the viscosity is affected by changes in temperature. 5. Low freezing point: remains liquid, not freeze during cold weather. 6. Stable quality without deterioration. 7. Good lubricity. 8. Causing no damages to metals, rubbers, etc.

While in use, it is found that the problems of the brake fluid may be always trivialized. The temperature of the brake fluid is increased due to heat generated during braking. When the temperature of the brake fluid is up to a certain degree, vaporization of the brake fluid occurs. Owing to the fact that the density of the gas is lower than that of the fluid, the efficiency of force transmission by the brake fluid is significantly reduced once the brake fluid is vaporized, Thus the brake power is lost due to vapor loco. Moreover, the brake fluid is also unable to transmit the braking force when the brake fluid is vaporized due to high temperature caused by braking. Thereby a probability of traffic accident is dramatically increased and the tragedy of death or injuries caused by the traffic car accident occurs more often. The driver's life and security are threatened.

SUMMARY OF THE INVENTION

Therefore, it is a primary object of the present invention to provide a brake fluid pipe detector which detects various data and information of a brake fluid in a brake fluid pipe such as working temperature, and brake pressure.

In order to achieve the above object, a brake fluid pipe detector according to the present invention is arranged between a brake hose and a brake caliper and including a main body which is provided with a fastening end for connection to the brake caliper and is communicating with the brake hose for delivering brake fluid. The brake fluid pipe detector features on that at least one installation port is arranged at the main body and installed with a sensor correspondingly. Thereby brake data and information such as working temperature and brake pressure of the brake fluid in the brake hose and the brake caliper can be detected by the sensor so as to ensure driving safety.

Preferably, the lain body further includes a head portion arranged at one end thereof and the fastening end is disposed on the other end of the main body, opposite to the end with the head portion. The installation port is mounted on a lateral surface of the head portion and a top surface of the head portion is provided with a fluid hole.

Preferably, the main body further includes a head portion arranged at one end thereof and the fastening end is disposed on the other end of the main body, opposite to the end with the head portion. A mounting-fixing portion is arranged between the head portion and the fastening end. A fluid hole formed on the mounting-fixing portion and the installation port is mounted on a top surface of the head portion.

Preferably, the main body further includes a head portion arranged at one end thereof and the fastening end is disposed on the other end of the main body, opposite to the end with the head portion. A mounting-fixing portion is arranged between the head portion and the fastening end. A fluid hole is formed on the mounting-fixing portion. An extended portion is arranged between the head portion and the mounting-fixing portion and the installation port is mounted on a lateral surface of the extended portion. A fluid-leakage threaded hole is formed on a top surface of the head portion and communicating with a fluid inlet channel while a screw can be fastened into the fluid-leakage threaded hole.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF' THE PREFERRED EMBODIMENT'

Figure 1:
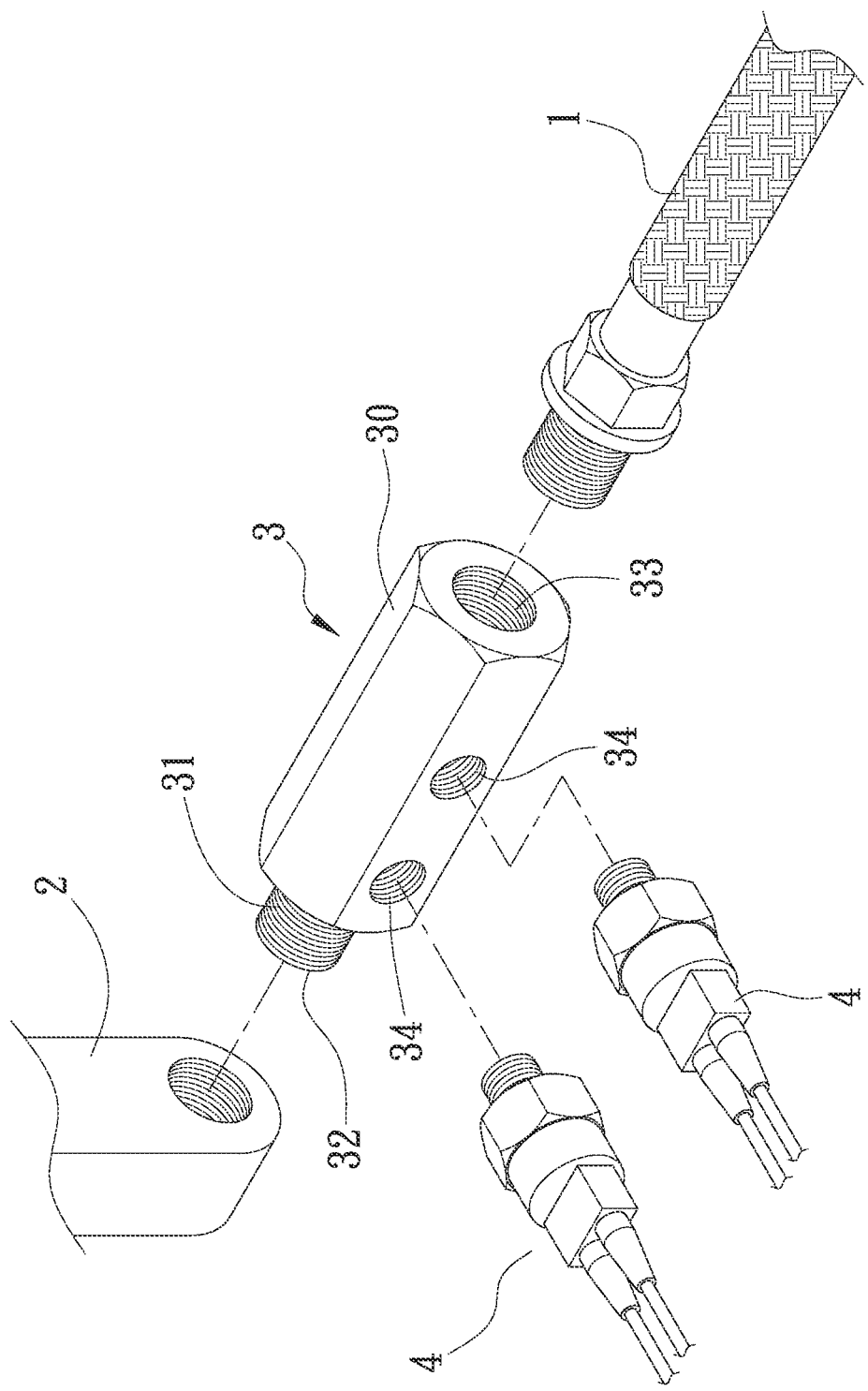
FIG. 1 is an exploded view of an embodiment according to the present invention.
Figure 3:
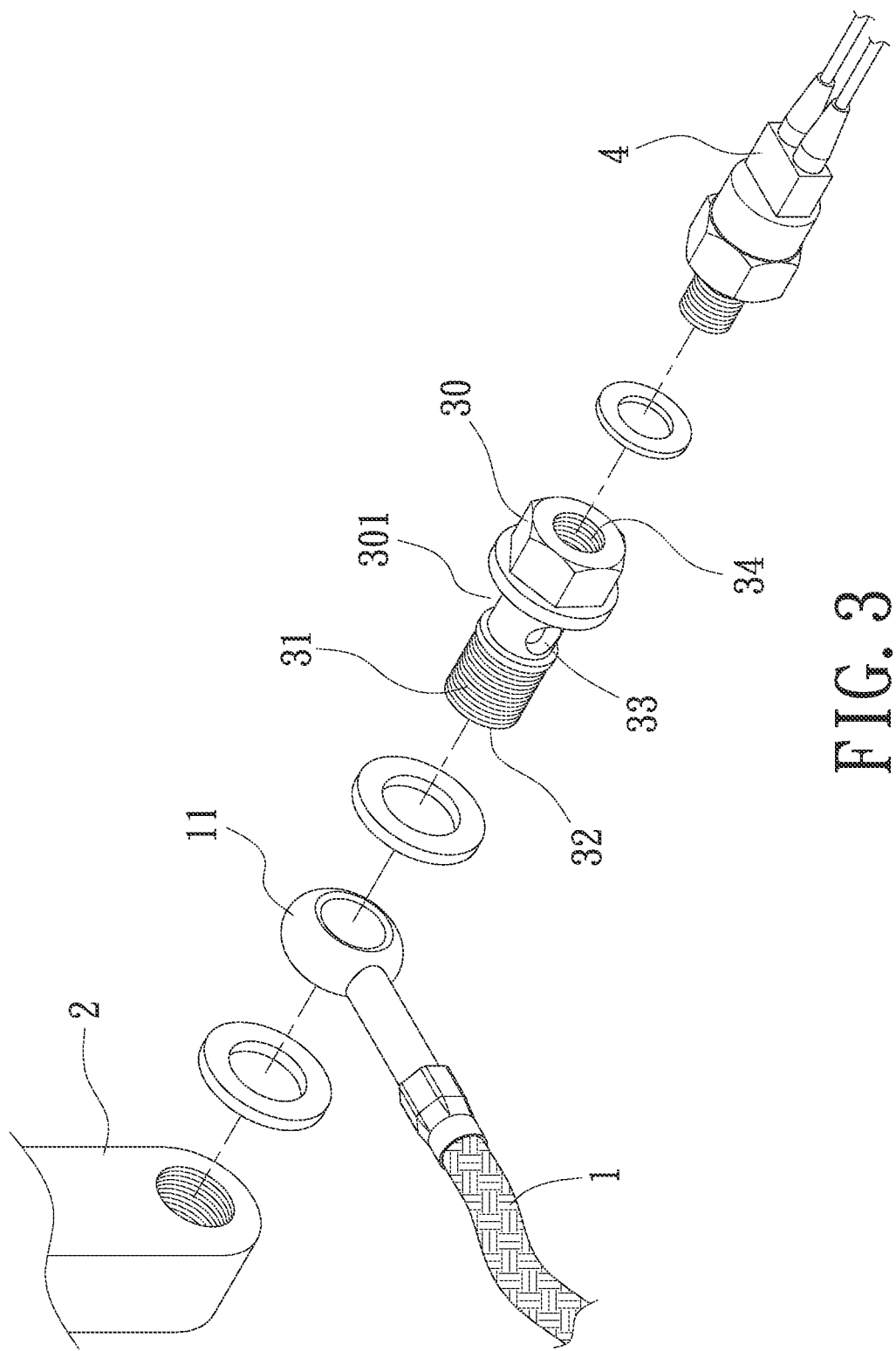
FIG. 3 is an exploded view of another embodiment according to the present invention.
Figure 6:
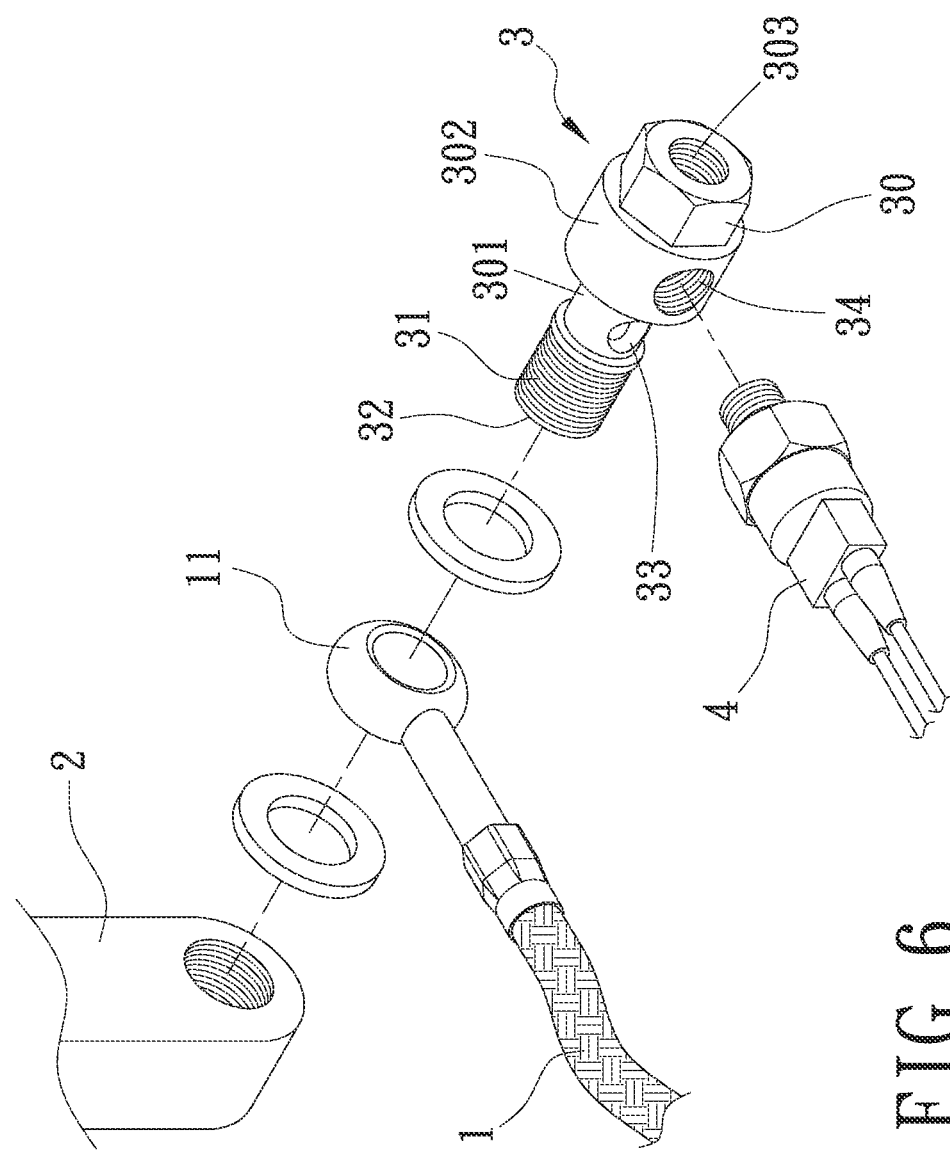
FIG. 6 is an exploded view of a further embodiment according to the present invention.

Refer to FIG. 1, FIG. 3, and FIG. 6, exploded views of various embodiments according to the present invention are revealed. A brake fluid pipe detector which is arranged between a brake hose 1 and a brake caliper 2 includes a main body 3 and at least one sensor 4.

The main body 3 consists of a fastening end 31 connected with the brake caliper 2, a fluid inlet channel 32 which introduces brake fluid into the brake caliper 2, and a fluid hole 33 disposed on the main body 3 and communicating with both the brake hose 1 and the fluid inlet channel 32. The brake fluid pipe detector features on that at least one installation port 34 is arranged at the main body 3 and communicating with the fluid inlet channel 32 while the sensor 4 is mounted to the installation port 34 correspondingly.

Refer to FIGS. 1-6, a plurality of embodiments of the present device with detailed descriptions during assembly and use is provided.

Embodiment 1

Figure 2:
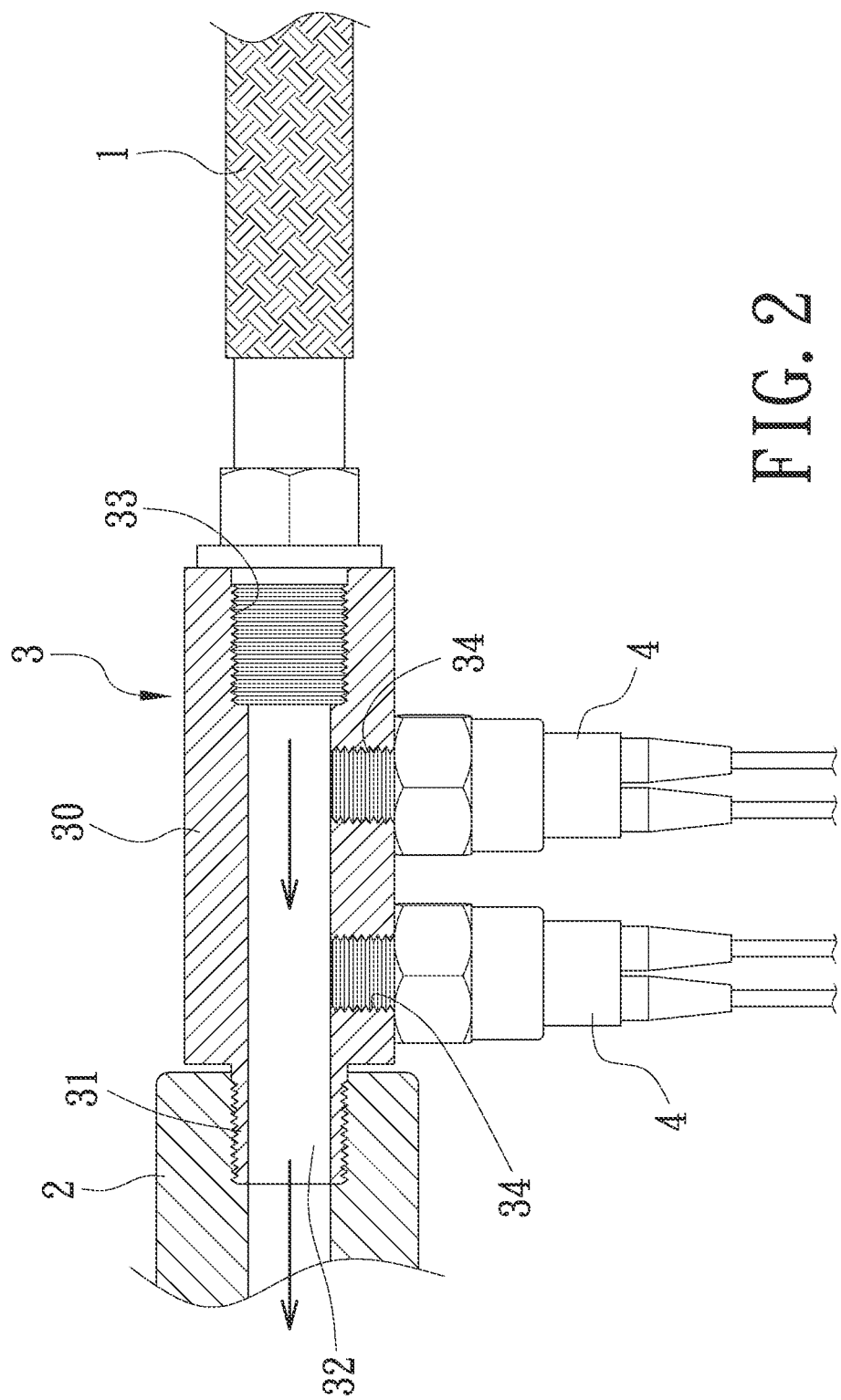
FIG. 2 is a schematic drawing showing a sectional view of an embodiment according to the present invention.

Refer to FIG. 1 and FIG. 2, the main body 3 includes a head portion 30 arranged at one end thereof and the fastening end 31 which is disposed on the other end of the main body 3 (like a bolt), opposite to the end with the head portion 30, and used for threaded and fixed with the brake caliper 2. The installation port 34 is mounted on a lateral surface of the head portion 30 and communicating with the fluid inlet channel 32. In the embodiment of the figure, there are two installation ports 34 each of which is used for mounting and fastening with a sensor 4. The sensor 4 can be a temperature sensor, a pressure sensor, or a sensor which detects brake information. The fluid hole 33 is mounted to a top surface of the head portion 30 and communicating with the fluid inlet channel 32. The brake hose 1 is fastened to the fluid hole 33 for delivering the brake fluid into the fluid inlet channel 32. Thereby the brake information including working temperature, brake pressure, etc. of the brake caliper 2 and the brake fluid can be obtained by the sensor 4.

Embodiment 2

Figure 4:
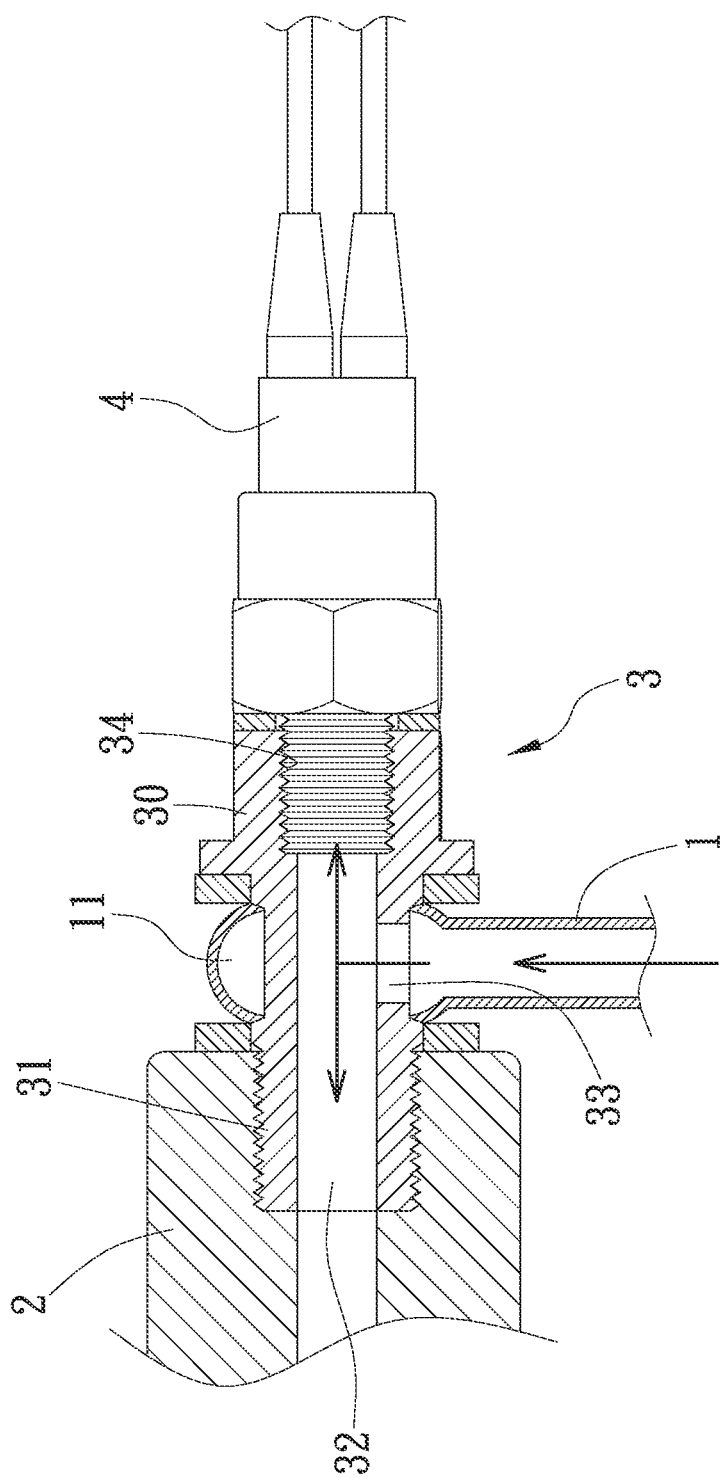
FIG. 4 is a schematic drawing showing a sectional view of another embodiment according to the present invention.
Figure 5:
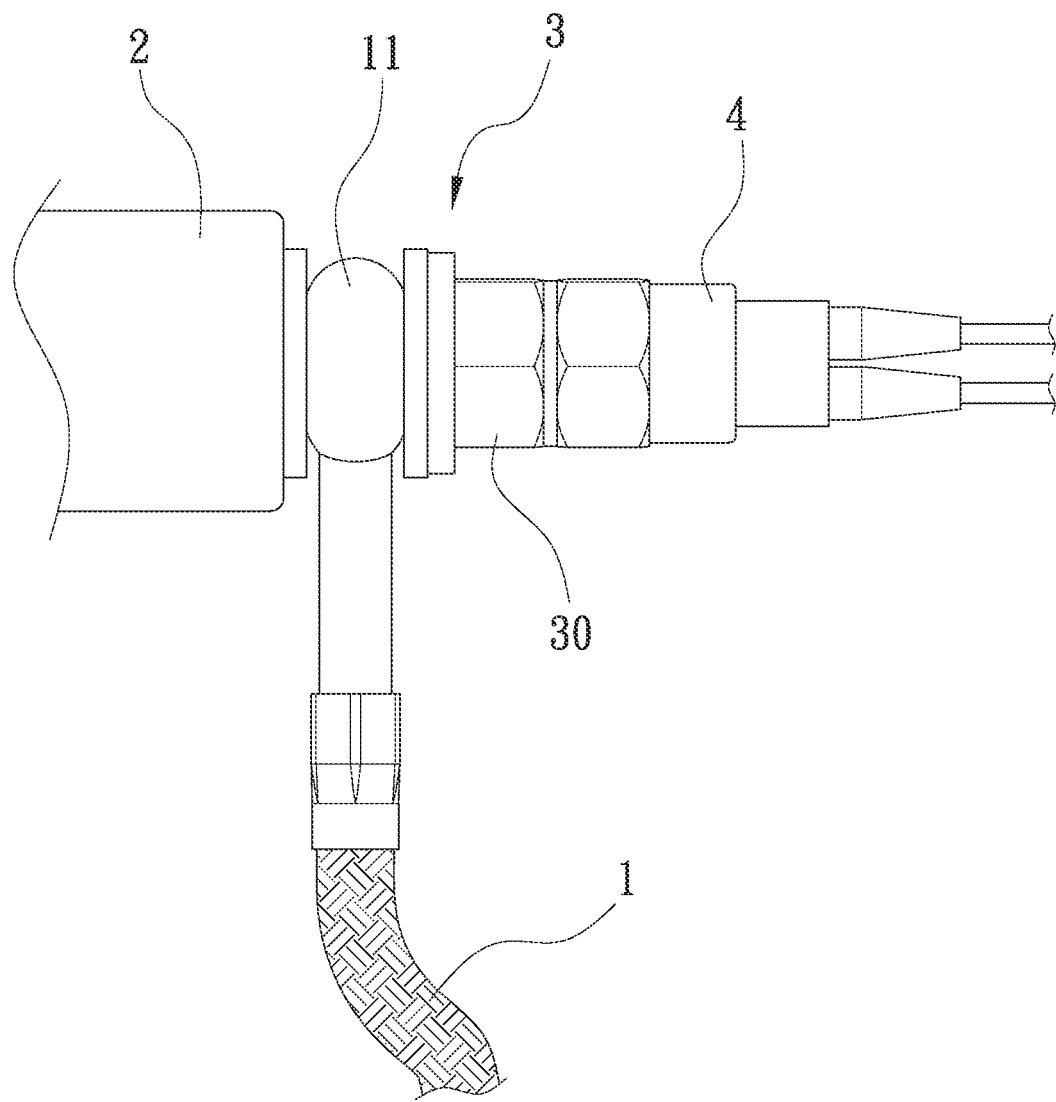
FIG. 5 is another schematic drawing showing a sectional view of another embodiment from a different angle according to the present invention.

As shown in FIGS. 3-5, the main body 3 includes a head portion 30 arranged at one end thereof and the fastening end 31 which is disposed on the other end of the main body 3 (like a bolt), opposite to the end with the head portion 30, and used for fastened with the brake caliper 2. A mounting-fixing portion 301 which is arranged between the head portion 30 and the fastening end 31 is provided with the fluid hole 33. A mounting ring 11 on a front end of the brake hose 1 is fit around the mounting-fixing portion 301 correspondingly and communicating with the fluid hole 33 to introduce the brake fluid into the fluid inlet channel 32. The installation port 34 which is mounted on a top surface of the head portion 30 and communicating with the fluid inlet channel 32 is used for mounting and fastening with a sensor 4. The sensor 4 can be a temperature sensor, a pressure sensor, or a sensor which detects brake information. Thereby the brake information including working temperature, brake pressure, etc. of the brake caliper 2 and the brake fluid can be detected by the sensor 4.

Embodiment 3

Refer to FIG. 6, a further embodiment is disclosed. The main body 3 includes a head portion 30 on one end thereof and the fastening end 31 which is disposed on the other end of the main body 3 (like a bolt) opposite to the end with the head portion 30 and used for threaded and fixed with the brake caliper 2 while a mounting-fixing portion 301 which is arranged between the head portion 30 and the fastening end 31 is provided with the fluid hole 33, A mounting ring 11 on a front end of the brake hose 1 is fit around the mounting-fixing portion 301 correspondingly and communicating with the fluid hole 33 for introducing the brake fluid into the fluid inlet channel 32. An extended portion 302 is arranged between the head portion 30 and the mounting-fixing portion 301 and the installation port 34 is mounted on a lateral surface of the extended portion 302 for mounting and fastening with a sensor 4. The sensor 4 can be a temperature sensor, a pressure sensor, or a sensor which detects brake information. Thereby the brake information including working temperature, brake pressure, etc. of the brake caliper 2 and the brake fluid can be obtained by the sensor 4.

A fluid-leakage threaded hole 303 is formed on a top surface of the head portion 30 and communicating with the fluid inlet channel 32. A screw (not shown in figure) can be fastened into the fluid-leakage threaded hole 303. The leakage of the brake fluid is carried out by removal of the screw from the fluid-leakage threaded hole 303.

In summary, the sensor 1 can be mounted to the brake fluid pipe without damage or modification of the brake caliper 2 or the brake hose by the present device. After being arranged at a pathway of the brake fluid being introduced, the brake information is detected by the sensor 4 and then transmitted to a receiving end or a display end (such as number, unit, light and sound (reminding (and warning function)) in a wired or wireless manner. Thus riders can get the brake information quickly and clearly to ensure driving safety.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A brake fluid pipe detector which is arranged between a brake hose and a brake caliper comprising:
a main body which includes a fastening end connected with the brake caliper, a fluid inlet channel which introduces brake fluid into the brake caliper, and a fluid hole disposed on the main body and communicating with both the brake hose and the fluid inlet channel, the main body further includes a head portion arranged at one end of the main body and the fastening end is disposed on an opposing end of the main body, opposite to the end with the head portion; said main body having a mounting-fixing portion is arranged between the head portion and the fastening end while the fluid hole is formed on the mounting-fixing portion; wherein an extended portion is arranged between the head portion and the mounting-fixing portion and at least one installation port is formed through a lateral surface of the extended portion; and
at least one sensor;
wherein the at least one installation port is formed in the main body and communicating with the fluid inlet channel with the at least one sensor being mounted to the installation port correspondingly.

2. The brake fluid pipe detector as claimed in claim 1, wherein a fluid-leakage threaded hole is formed on a top surface of the head portion and communicating with the fluid inlet channel while a screw is able to be fastened into the fluid-leakage threaded hole.

* * * * *